March 4, 1958
C. REYKJALIN
2,825,437
COUPLING APPARATUS
Filed Sept. 7, 1954
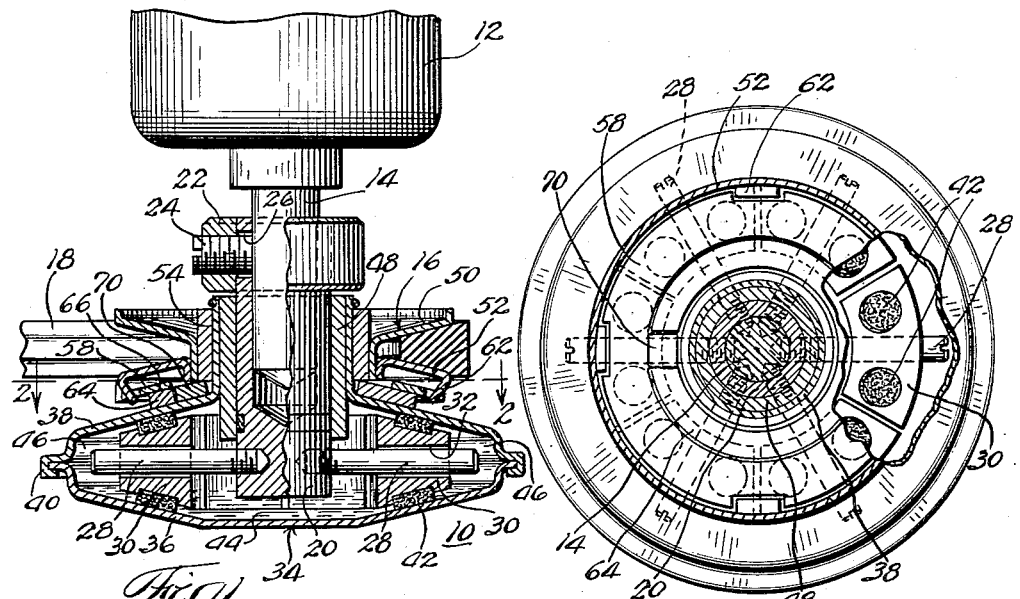
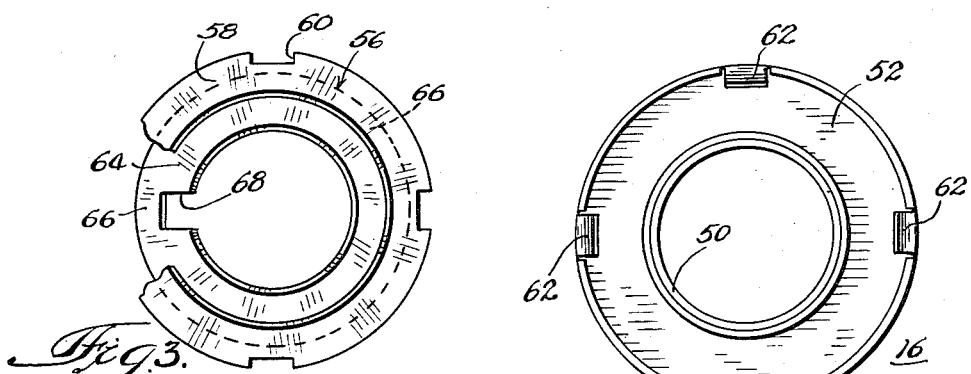
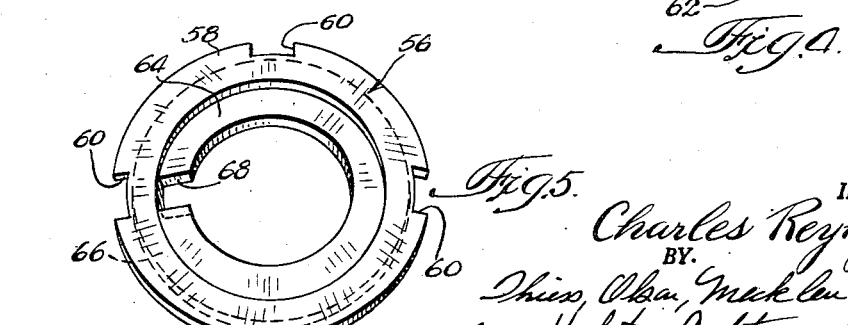
INVENTOR.
Charles Reykjalin.

United States Patent Office 2,825,437
Patented Mar. 4, 1958

2,825,437

COUPLING APPARATUS

Charles Reykjalin, Melrose Park, Ill., assignor, by mesne assignments, to Koren Research & Engineering Company, Chicago, Ill., a corporation of Illinois Application September 7, 1954, Serial No. 454,300

14 Claims. (Cl. 192—105)

This invention relates to improved coupling apparatus and more particularly to an improved device for coupling two rotatable elements in fixed angular relationship within predetermined limits of speed and torque.

It is one principal object of this invention to provide an improved coupling device which will disengage under the influence of excessive loads applied over prolonged periods of time and which will also be responsive to speeds and torques within predetermined ranges. Various devices have been proposed heretofore which were designed to couple a driving shaft to a rotatable load. Such devices have featured one or more of the characteristics inherent in this invention, but none has been taught which has all of the desirable characteristics of the instant invention. The characteristics required in certain applications for which the instant invention is especially well adapted include a coupling of the motive means to the associated load for speeds above a predetermined minimum, decoupling of the motive means from the load for torques in excess of a predetermined maximum and a complete disengagement of the coupling means for excessive loads over a predetermined prolonged period of time. The first characteristic is desirable in order to use a motive means of limited torque which will have sufficient starting inertia to rotate the load when the coupling means engages. The second and third characteristics of the coupling means protect the motive means from damage when excessive loads are experienced. Devices heretofore proposed for accomplishing these aims have included various centrifugal devices for speed sensitivity and such means as shear pins, overload circuit breakers and the like for excess torque and load protection. However, such devices have proven generally unsatisfactory as they do not provide for easy re-establishment of power to the load, are not sufficiently sensitive to the torque and load being transmitted or the duration of a prolonged overload and are also expensive and cumbersome devices not readily repaired after experiencing an overload condition.

It is therefore a further object of this invention to provide an improved coupling device which is actuated only at speeds above a predetermined minimum and which is deactuated for torques and load above a predetermined maximum.

It is another object of this invention to provide an improved coupling device which permits slippage between driving and driven members during an initial starting period; through which the members become firmly engaged to prevent slippage during normal torque transmissions; and which will be dis-engaged upon a prolonged application of excess torque.

It is still another object of this invention to provide an improved coupling device which is speed and torque sensitive and which has a thermally sensitive permanent disengaging element to prevent excessive heating or damage to the parts thereof for torques in excess of the designed range of the device.

It is another object of this invention to provide an improved overload protection for a coupling device by which heat is transmitted from a slipping element to a contiguous thermally sensitive element comprising a pair of fused annular rings.

It is still a further object of this invention to provide a thermally fusible element for a coupling device which has a large fusible area to provide high sensitivity while maintaining good torque transmitting characteristics.

It is a further object of this invention to provide a speed and torque sensitive coupling device having thermally fusible overload protection, said protection being a replaceable element which may be easily stocked by a user or repaired on the job under emergency conditions.

Further and additional objects of this invention will become manifest from a consideration of this specification, the accompanying drawings and the appended claims.

In one form of this invention a lubricant filled centrifugal clutch is provided in which the input member is a rotatable shaft having a plurality of radially movable clutch elements with wedge-shaped surfaces adapted to engage correspondingly shaped surfaces in a housing comprising the driven member. The driven member is coupled to an output member through a pair of annular rings, one of which is keyed to the driven member and the other of which is keyed to the output member, said annular rings having congruent annular surface portions which are juxtaposed and secured together by an appropriate film of fusible metal.

For a more complete understanding of this invention reference will now be made to the accompanying drawing wherein:

Fig. 1 is an axial sectional view of one embodiment of this invention;

Fig. 2 is a transverse sectional view of the embodiment of Fig. 1, taken on the line 2—2 thereof with portions of the driven housing removed;

Fig. 3 is a top plan view of the thermally sensitive element of the embodiment of Fig. 1;

Fig. 4 is a bottom plan view of the output element of the embodiment of Fig. 1; and Fig. 5 is a perspective view of the thermally sensitive element shown in Fig. 3.

Referring now to the drawing and more particularly to Fig. 1, a coupling device 10 is illustrated which is both speed and torque sensitive and also has protective features to insure against prolonged overloading of the motive means. A motive means 12 has an output shaft 14 to which the coupling device 10 is secured and a sheave 16 forming a part of the coupling device 10 is engaged by a conventional V-belt 18, which may drive any rotatable load in the well understood manner. The coupling device 10 comprises a central hollow shaft 20 which is secured to the motor shaft 14 by a collar 22 having a set screw 24 threadably engaged therein and in abutting engagement with the shaft 14. The set screw 24 passes through an appropriate aperture 26 in the hollow shaft 20.

A plurality of pins 28 extend radially from the outer end of the hollow shaft 20 and are threadably secured therein to form a spider-like assembly. In the particular embodiment illustrated six such pins extend outwardly from the shaft 20 as illustrated more clearly in Fig. 2. The pins 28 form a driving spider and a weight 30 is slidably mounted on each of said pins. Each weight 30 has a central aperture 32 formed therein which is of substantially greater diameter than the outside diameter of the associated pin 28 whereby the weight is freely movable radially thereon. The spider and weights are disposed within a housing 34 which comprises the driven member. The housing has generally convergent sides and as illustrated in the drawing is assembled from two cooperating sheet metal elements 36 and 38. An annular lip 40 is formed in the housing element 38 which is formed around the free edge of element 36 whereby a sealed enclosure is provided. The wedge-shaped weights 30 have annular faces corresponding to the angularly disposed surfaces of the housing 34 whereby rotation of the driving spider will effect radial movement of the weights 30 and consequent engagement of the angular surfaces with the inner surfaces of the housing 34. A plurality of pads 42 are provided on each weight 30 to insure good frictional contact between each weight and the housing walls. The pads may be of any appropriate material having the desired frictional and wear characteristics although an impregnated fiber construction has been found especially well adapted for this purpose. The pads 42 are preferably cemented into appropriate depressions in the weights 30.

The housing 34 is partially filled with a lubricant 44 to provide predetermined slippage characteristics between the weights and the housing. Upon initial actuation of the device the lubricant is splashed about within the housing providing a low frictional engagement between the pads 42 and the housing. As the housing begins to rotate, however, the lubricant therein is forced outwardly by centrifugal force to fill the area 46 about the periphery of the housing 34 and the pads 42 will quickly be wiped substantially free of lubricant whereby a rigid frictional engagement is provided, the coupling thereby being free of slippage for normal torque transmission. While the lubricant shown in this embodiment is a conventional lubricating oil, various lubricating oils or certain powdered or comminuted lubricants may also be used herein.

The housing 34 is mounted on the hollow shaft 20 with a bearing material 48 disposed therebetween. Upon initial actuation of the device there will be relative rotation between the cylindrical shaft 20 and the housing 34 but after the housing reaches full speed, the elements will function as an integral unit. The output sheave 16 is composed of two sheet metal elements 50 and 52 secured together, as by welding, to form a V-shaped receiver for the belt 18. The sheave 50 is rotatably mounted on the housing 34 through bearing material 54 but is normally secured against rotation with respect to the housing 34.

A fixed angular relationship is established between the housing 34 and the sheave 16 through a thermally sensitive assembly 56. The assembly 56 includes a ring 58 having four notches 60 peripherally disposed for engagement by inwardly disposed detents 62 angularly formed from the sheave element 52. The second annular ring 64 is secured to the annular ring 58 by an insert or film of fusible material 66. The ring 64 has a single notch 68 formed therein which is normally engaged by a lug 70 rigidly secured to the housing 34. It is believed clear that power is transmitted from the housing 34 through the lug 70, the annular ring 64, the ring 58 which is secured to the ring 64 by fusible matreial, and the sheave 16 to the output belt 18. If, however, excessive torque is experienced by the device, slippage occurs between the driving spider and the driven housing to generate substantial heat. This heat is quickly transmitted through the housing and the annular ring 64 to the fusible material 66. When the device has continued to slip for a long period of time the temperature of the fusible material 66 is elevated to a point where said material becomes plastic and at this temperature the annular rings 58 and 64 become free to rotate relatively, thus disengaging the load from the motive means. The excessive heating will not be experienced during the starting portion of an operating cycle because the splashing lubricant maintains a low coefficient of friction and the time duration is relatively short.

The clutch or coupling device taught by this invention may be reconditioned readily for additional use following a thermal release by the removal of the set screw 24 and the replacement of the separated annular rings 58 and 64 with a new set of fused rings. The material used to secure the rings together may be any one of many well known fusible materials, although alloys of tin, lead and bismuth function especially well in this capacity. The alloy selected will depend upon the temperature at which release is desired. One particular alloy of lead and tin which was employed in the described embodiment became plastic at 250° which may be attained in a short period of time when the device is experiencing a substantial overload.

While one particular embodiment has been described in detail, various combinations of elements will occur to one skilled in the art which will accomplish the desired ends and objects taught herein and all of these combinations are believed clearly within the spirit and scope of this invention. For example, the sheave and housing of the described embodiment are formed of sheet metal to produce an inexpensive and light weight device. However, these elements may be cast or machined for greater precision where accurate limitations must be maintained.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:

1. A coupling device comprising a rotatable driving means, a coaxial rotatable driven means, friction means connecting said driven and said driving means, output means mounted on said driven means, first annular means detachably fixed to said driven means for rotation therewith, and second annular means detachably fixed to said output means for rotation therewith, said first and second annular means being juxtaposed and fused together by thermally sensitive means and removable as a unit from said device, said driven means and said output means being freely rotatable relatively whenever said thermally sensitive means is heated permitting separation of said first and second annular means.

2. A torque sensitive coupling device comprising a rotatable driving means, a coaxial rotatable driven means, friction means connecting said driven and said driving means, output means coaxially mounted relative to said driven means, and thermally sensitive means interconnecting said output means and said driven means in a fixed angular relationship, said thermally sensitive means comprising a pair of rings having congruent annular surface portions secured together by thermally sensitive means one of said rings being connected to each of said output means and said driven means, said driven means and said output means being freely rotatable relatively whenever said thermally sensitive means is heated, permitting separation of said first and second annular portions.

3. A torque sensitive coupling device comprising a rotatable driving means, a coaxial rotatable driven means, friction means connecting said driven and said driving means, output means coaxially mounted relative to said driven means, and thermally sensitive means interconnecting said output means and said driven means in a fixed angular relationship, said thermally sensitive means comprising a pair of rings having congruent annular surface portions and a thermally sensitive material adhering to said surface means one of said rings being connected to each of said output means and said driven means, said driven means and said output means being freely rotatable relatively whenever said thermally sensitive material is heated, permitting separation of said first and second annular portions.

4. A torque sensitive coupling device comprising a rotatable driving means, a coaxial rotatable driven means, friction means connecting said driven and said driving means, output means coaxially mounted relative to said driven means, and thermally sensitive means interconnecting said output means and said driven means in a fixed angular relationship, said thermally sensitive means comprising a first annular ring keyed to said driven means, a second annular ring keyed to said output means, said first and second rings having congruent annular portions in juxtaposed relationship, and a thermally fusible material disposed between said congruent portions and securing said portions together said driven means and said output means being freely rotatable relatively whenever said thermally fusible material is heated, permitting separation of said annular portions.

5. A torque sensitive coupling device comprising a rotatable driving means, a coaxial rotatable driven means, friction means connecting said driven and said driving means, output means coaxially mounted relative to said driven means, and thermally sensitive means interconnecting said output means and said driven means in a fixed angular relationship, said thermally sensitive means comprising a first annular ring keyed to said driven means and in intimate thermal contact with said friction means, a second annular ring keyed to said output means, said first and second rings having congruent annular portions in juxtaposed relationship, and a thermally sensitive fusible metal disposed between said congruent portions and securing said rings together, said rings comprising a replaceable protective unit said driven means and said output means being freely rotatable relatively whenever said thermally fusible metal is heated, permitting separation of said annular portion.

6. A torque sensitive coupling device comprising a rotatable driving means, a coaxial rotatable driven means, friction means connecting said driven and said driving means, output means coaxially mounted relative to said driven means, thermally sensitive means interconnecting said output means and said driven means in a fixed angular relationship, said thermally sensitive means comprising protuberance means extending from said driven means, a first annular ring having aperture means in engagement with said protuberance means, second protuberance means extending from said output means, a second annular ring having aperture means in engagement with said second protuberance means, said first and second rings having congruent annular portions in juxtaposed relationship, and a thermally sensitive fusible material disposed between said congruent portions and securing said rings together said driven means and said output means being freely rotatable relatively whenever said thermally fusible material is heated, permitting separation of said annular portions.

7. A speed and torque sensitive coupling device comprising a rotatable driving means, a coaxial rotatable driven means, centrifugally actuated friction means connecting said driving and said driven means, output means coaxially mounted relative to said driven means, and thermally sensitive means interconnecting said output means and said driven means in a fixed angular relationship, said thermally sensitive means comprising a first annular ring keyed to said driven means and in intimate thermal contact with said friction means, a second annular ring keyed to said output means, said first and second rings having congruent annular portions in juxtaposed relationship, and a thermally sensitive fusible metal disposed between said congruent portions and securing said rings together, said rings comprising a replaceable protective unit said driven means and said output means being freely rotatable relatively whenever said thermally fusible metal is heated, permitting separation of said annular portions.

8. A speed and torque sensitive coupling device comprising a rotatable driving means, a coaxial driven housing enclosing said driving means, centrifugally actuated friction means carried by and radially movable relative to said driving means, said friction means engaging said driven housing at a predetermined speed, a lubricant partially filling said housing, contacting said friction means for all speeds below said predetermined speed and displaced therefrom by centrifugal force for speeds above said predetermined speed, output means coaxially mounted relative to said driven housing, and thermally sensitive means interconnecting said output means and said driven housing in fixed angular relationship, said thermally sensitive means comprising a thermally sensitive material and a pair of rings having congruent annular surface portions secured together by said thermally sensitive material said driven housing and said output means being freely rotatable relatively whenever said thermally sensitive material is heated, permitting separation of said annular portions.

9. A speed and torque sensitive coupling device comprising a rotatable driving means, a coaxial driven housing enclosing said driving means, centrifugally actuated friction means carried by and radially movable relative to said driving means, said friction means engaging said driven housing at a predetermined speed, a lubricant partially filling said housing, contacting said friction means for all speeds below said predetermined speed and displaced therefrom by centrifugal force for speeds above said predetermined speed, output means coaxially mounted relative to said driven housing, and thermally sensitive means interconnecting said output means and said driven housing in fixed angular relationship, said thermally sensitive means comprising a first annular ring keyed to said driven housing and in intimate thermal contact with said friction means, a second annular ring keyed to said output means, said first and second rings having congruent annular portions in juxtaposed relationship, and a thermally sensitive fusible metal disposed between said congruent portions and securing said rings together, said rings comprising a replaceable protective unit said driven housing and said output means being freely rotatable relatively whenever said thermally sensitive metal is heated, permitting separation of said annular portions.

10. A torque sensitive coupling device comprising a rotatable driving shaft, a coaxial driven housing partially enclosing said shaft and providing a sealed enclosure, said housing having a pair of opposed convergent generally conic surfaces extending outwardly from said shaft, a plurality of clutch weights angularly disposed about said shaft and radially movable relative thereto, said clutch weights having radially convergent surfaces corresponding to the convergent surfaces of said housing whereby centrifugal force effects engagement therebetween for driving shaft speeds above a predetermined minimum, a lubricant partially filling said enclosure, output means coaxial relative to said housing, and thermally sensitive means interconnecting said output means comprising a thermally sensitive material and a pair of rings having congruent annular surface portions secured together by said thermally sensitive material said driven housing and said output means being freely rotatable relatively whenever said thermally sensitive material is heated, permitting separation of said annular portions.

11. A torque sensitive coupling device comprising a rotatable driving shaft, a coaxial driven housing partially enclosing said shaft and providing a sealed enclosure, said housing having a pair of opposed convergent generally conic surfaces extending outwardly from said shaft, a plurality of clutch weights angularly disposed about said shaft and radially movable relative thereto, said clutch weights having radially convergent surfaces corresponding to the convergent surfaces of said housing whereby centrifugal force effects engagement therebetween for driving shaft speeds above a predetermined minimum, a lubricant partially filling said enclosure, output means coaxial relative to said housing, and a thermally sensitive means interconnecting said output means and said housing in a fixed angular relationship, said thermally sensitive means comprising a first annular ring keyed to said driven housing and in intimate thermal contact with said friction means, a second annular ring keyed to said output means, said first and second rings having congruent annular portions in juxtaposed relationship, and a thermally sensitive fusible metal disposed between said congruent portions and securing said rings together, said rings comprising a replaceable protective unit said driven housing and said output means being freely rotatable relatively whenever said thermally sensitive metal is heated, permitting separation of said annular portions.

12. A torque sensitive coupling device comprising a rotatable driving shaft, a coaxial driven housing partially enclosing said shaft and providing a sealed enclosure, said housing having a pair of opposed convergent generally conic surfaces extending outwardly from said shaft, a plurality of clutch weights angularly disposed about said shaft and radially movable relative thereto, said clutch weights having radially convergent surfaces corresponding to the convergent surfaces of said housing whereby centrifugal force effects engagement therebetween for driving shaft speeds above a predetermined minimum, a lubricant partially filling said enclosure, output means coaxial relative to said housing, locking means removably maintaining said output means and said annular rings on said driven housing, and a thermally sensitive means interconnecting said output means and said housing in a fixed angular relationship, said thermally sensitive means comprising a first annular ring keyed to said driven housing and in intimate thermal contact with said friction means, a second annular ring keyed to said output means, said first and second rings having congruent annular portions in juxtaposed relationship, and a thermally sensitive fusible metal disposed between said congruent portions and securing said rings together, said rings comprising a replaceable protective unit said driven housing said output means being freely rotatable relatively whenever said thermally sensitive metal is heated, permitting separation of said annular portions.

13. A speed and torque sensitive coupling device comprising a rotatable element, a coaxial rotatable means, centrifugally actuated friction means connecting said element and said rotatable means, coupling means coaxially mounted relative to said rotatable means, and thermally sensitive means interconnecting said rotatable means and said coupling means in a fixed angular relationship, said thermally sensitive means comprising first annular means fixed to said coupling means, and second annular means fixed to said rotatable means, said first and second annular means being fused by thermally sensitive material and removable as a unit from said device said rotatable means and said coupling means being freely rotatable relatively whenever said thermally sensitive material is heated, permitting separation of said first and second annular means.

14. Thermally responsive means for drivingly connecting a coupling means and a coaxial rotatable clutch means comprising a first annular member fixed to said coupling means, a second annular member fixed to said clutch means, and a thermally responsive fusible material disposed between said first and second annular members and fused thereto, said annular members and said fusible material forming a removable unit said coupling means and said clutch means being freely rotatable relatively whenever said fusible material is heated, permitting separation of said first and second annular members.

References Cited in the file of this patent

UNITED STATES PATENTS

| | | |
|---|---|---|
| 1,623,862 | Broussouse | Apr. 5, 1927 |
| 1,857,020 | Hatcher | May 3, 1932 |
| 2,140,723 | Spicer | Dec. 20, 1938 |
| 2,423,979 | Jenson | July 15, 1947 |
| 2,539,534 | Eckhardt | Jan. 30, 1951 |

FOREIGN PATENTS

| | | |
|---|---|---|
| 510,000 | Germany | Oct. 15, 1930 |

U. S. DEPARTMENT OF COMMERCE

PATENT OFFICE

CERTIFICATE OF CORRECTION

Patent No. 2,825,437                                      March 4, 1958

Charles Reykjalin

It is hereby certified that error appears in the printed specification of the above numbered patent requiring correction and that the said Letters Patent should read as corrected below.

Column 3, line 56, for "matreial" read -- material --; column 5, line 30, for "portion" read -- portions --; column 7, line 37, after "housing" insert -- and --.

Signed and sealed this 22nd day of April 1958.

(SEAL)

Attest:

KARL H. AXLINE                                              ROBERT C. WATSON

Attesting Officer                                         Commissioner of Patents